United States Patent [19]

Syben

[11] 4,431,530

[45] Feb. 14, 1984

[54] APPARATUS FOR EXTRACTING FOREIGN BODIES AND HEAVY PARTS FROM FIBER MATERIAL

[75] Inventor: Walter Syben, Monchen-Gladbach, Fed. Rep. of Germany

[73] Assignee: Trützschler GmbH & Co. KG, Monchen-Gladbach, Fed. Rep. of Germany

[21] Appl. No.: 327,507

[22] Filed: Dec. 4, 1981

[30] Foreign Application Priority Data

Dec. 5, 1980 [DE] Fed. Rep. of Germany ....... 3045899

[51] Int. Cl.³ .......................... B07B 4/08; B07B 7/01
[52] U.S. Cl. .................................. 209/138; 209/154; 209/474
[58] Field of Search ........................ 209/136–139 R, 209/146, 147, 149, 154, 474

[56] References Cited

U.S. PATENT DOCUMENTS

| 149,869 | 4/1874 | Lacroix | 209/138 |
| 1,327,452 | 1/1920 | Williams | 209/138 |
| 1,658,916 | 2/1928 | Bothwell et al. | |
| 2,499,037 | 2/1950 | Roles | 209/136 |
| 2,586,223 | 2/1952 | Harmon | 209/138 |
| 2,762,506 | 9/1956 | Fine | 209/139 R |
| 3,163,595 | 12/1964 | Denovan | 209/154 |
| 3,442,379 | 5/1969 | Schneider et al. | 209/137 |
| 4,219,410 | 8/1980 | Herder | 209/136 |

FOREIGN PATENT DOCUMENTS

| 969075 | 4/1958 | Fed. Rep. of Germany | 209/138 |
| 862966 | 3/1941 | France | 209/139 R |
| 717536 | 10/1966 | Italy | 209/154 |
| 107425 | 5/1943 | Sweden | 209/137 |
| 455219 | 10/1936 | United Kingdom | 209/502 |
| 438386 | 1/1975 | U.S.S.R. | 209/136 |

Primary Examiner—David L. Lacey
Attorney, Agent, or Firm—Spencer & Frank

[57] ABSTRACT

An apparatus for separating a desired, relatively light fibrous fraction from admixture with foreign bodies, such as sheaths, metal parts, plastic parts and the like and having parts, such as stems, rind remnants, leaf parts and the like. The apparatus comprises structure which causes separation by gravity and which conveys the mixture past a separation location and floats the relatively light fibrous fraction from the mixture in an upwardly directed air stream.

9 Claims, 5 Drawing Figures

APPARATUS FOR EXTRACTING FOREIGN BODIES AND HEAVY PARTS FROM FIBER MATERIAL

BACKGROUND OF THE INVENTION

The invention relates to a method for extracting foreign bodies, such as sheaths, metal parts, plastic parts or the like and heavy parts, such as stems, rind remnants, leaf parts or the like from fibrous material, such as fiber tufts, waste material or the like, and encompasses an apparatus for performing the method.

In the reprocessing of fiber material wastes, such as cotton waste, plant waste, and the like, it is becoming more and more important to separate out metal parts and heavy parts from the fiber materials before the fiber materials are delivered to subsequent processing machines, such as raveling machines and preferably sawtooth cleaners. Magnetic separators commonly are used to extract a substantial proportion of the individual magnetic parts, but they are incapable of extracting non-magnetic materials, such as wood and plastic parts, or heavier, undesirable plant parts such as stems which impair the functioning of the subsequent fiber processing machines.

SUMMARY OF THE INVENTION

In accordance with the invention, fiber material which has been contaminated with foreign bodies, heavy parts and the like is placed on a conveyor element. A pneumatic separation of the light fiber material from the heavy foreign bodies, heavy parts or the like takes place, and the cleaned fiber material is removed. The foreign bodies, heavy parts or the like, to which fiber material may still be adhering in limited amounts, remain on the conveyor element and are subsequently discarded.

The pneumatic separation may be carried out by means of suction, provided by a suction element, such as a suction pipe, disposed above the conveyor. This suction causes the fiber material located on the conveyor element to be lifted from the conveyor element and to be transported further via lines of tubing. Foreign bodies and heavy parts continue to be carried by the conveyor element and are removed subsequently, for instance, they are removed to a subsequent waste box. An important aspect of the method according to the invention is separation by gravity; the relatively light fiber material is carried upward by the suction of the air current, while the relatively heavy foreign bodies and heavy parts remain on the conveyor element.

It sometimes happens that utilizable fiber material continues to adhere to the foreign bodies and/or heavy parts and is later undesirably discarded. In order to limit the amount of wasted fiber material, an air flow preferably acts upon the fiber material, counter to its direction of movement, at a location between the suction element and the conveyor element. As a result, the fiber material which had remained with the foreign bodies or heavy parts passes at least in part toward the opening of the suction element. This air flow may be embodied simply by the aspirating air flow of the suction element. However, a supplementary air flow may also be used, which acts from the outside in the same manner.

According to a further embodiment of the invention, the pneumatic separation may be accomplished by providing an upward stream of air, e.g., from compressed air nozzels, through the heterogeneous mixture of fiber material, foreign bodies and heavy parts.

The invention also comprehends an apparatus for extracting foreign bodies such as sheaths, metal parts, plastic parts or the like and heavy parts, such as stems, rind remnants, leaf parts or the like from fiber material, such as fiber tufts, waste material or the like, in which at least one element is associated with a conveyor element for air transporting the fiber material upwardly from the conveyor.

According to the preferred embodiment of the invention, the element for air transporting the fiber material upwardly from the conveyor comprises at least one suction element associated with a conveyor element used to transport the fiber material. The suction element is preferably disposed above the conveyor element, the suction opening being directed at the fiber material located on the conveyor element.

In accordance with one feature of the invention, the conveyor element is an obliquely placed chute on which the mixture of the fiber material to be cleaned and the foreign bodies or heavy parts slide downward by the force of gravity. If it is intended that the fiber material and the foreign bodies or heavy parts be transported in the horizontal direction, then a conveyor belt is provided as the conveyor element.

In accordance with a modified form of the invention, the conveyor element is permeable to air, and compressed-air nozzles are provided below the conveyor element, in the vicinity of the opening of the suction element. These compressed-air nozzles generate a supplementary, reinforcing air flow from below, which elevates the lighter fiber fraction of the mixture upwardly toward an overhead conduit, which may be a suction element.

In yet a further form of the invention, at least one partitioning element is associated with the lower end of the suction element. This partitioning element aids in separating the fiber material from the foreign bodies or heavy parts and is embodied as a depending partitioning plate, partitioning flap or the like having an adjustable plate at its lower end oriented toward the conveyor element. The partitioning element is thereby adjustable in height, so that the opening between the partitioning element and the conveyor element for the passage of the foreign bodies, heavy parts and the like is adjustable. The partitioning element is supported so as to be rotatable at its lower end oriented toward the suction element, so that aspirating air flow introduced at the partitioning element can be guided in variable directions.

Preferably, a collection element for the foreign bodies, heavy parts or the like remaining on the conveyor is provided at one end of the conveyor element. The collection element preferably is a collection container which is closed on all sides, but has a feed opening for the extracted foreign bodies, heavy parts or the like and an adjustable air inlet opening. Through this air inlet opening, either aspirated air or air under pressure is introduced to flow countercurrently to the conveying direction through the opening between the suction element and the conveyor element, for instance, below the partitioning plate. Therefore, the fibers or fiber tufts reaching this latter opening are reliably flushed into the suction line by this air flow.

In accordance with a further preferred embodiment, the adjustable plate, which is located by way of example at the lower end of the suction element or of the partitioning flap, is operatively connected to the adjustable air inlet opening. as a result, when the position of the adjustable plate is varied, there is a simultaneous variation of the air inlet opening and thus of the supplemental air flow.

In still another version of the apparatus, the conveyor element is permeable to air and the blower nozzles are disposed below the conveyor element, the blower openings being directed onto the conveyor element. With this apparatus, the utilizable fiber components on the one hand are separated from the foreign bodies, heavy parts or the like on the other by means of gravity. The utilizable fibers are lifted upward from the conveyor element, while the foreign bodies, heavy parts or the like remain on the conveyor element and are subsequently discarded.

The invention will be described in greater detail below, with the aid of exemplary embodiments illustrated in the drawings.

DETAILED DESCRIPTION OF THE PREFERRED EMBODIMENTS

Figure 1:
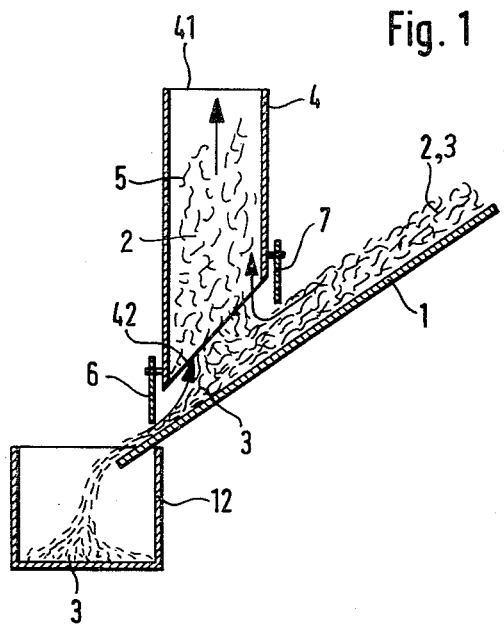
FIG. 1 is a schematic representation of an apparatus according to the invention which is capable of carrying out the method of the invention including an inclined conveyor chute and a suction arrangement.

FIG. 1 shows an obliquely placed chute 1 as the conveyor element. On the higher part of the chute 1, there are uncleaned fiber tufts 2, which contain foreign bodies, heavy parts or the like 3. Disposed above the lower part of the chute 1 is a suction element 4, such as a fixed metal tubular conduit having its upper end 41 attached to a transport ventilator (not shown).

The lower end of the suction element 4, which is the suction element opening 42, is directed at, and closely overlies, the fiber tufts 2 and the foreign bodies, heavy parts or the like 3 located on the chute 1. In the suction element 4, the utilizable fiber tufts 5 are drawn upward (see arrow). At the lower end of the suction element 4, that is, at the suction opening 42, there are provided two adjustable plates or extensions 6, 7 which are adjustable vertically to define the space between the suction opening 42 and the chute 1, or rather the material located on the chute. The arrows below the extensions 6, 7 indicate that between the suction element 4 and the chute 1, an air flow (see arrows) embodied by the air aspirated from outside by the ventilator acts upon the fiber material, foreign bodies, heavy parts or the like located on the chute 1.

Figure 1A:
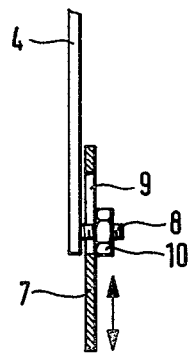
FIG. 1a is a detailed illustration of an adjustable plate or extension of the embodiment of FIG. 1.

As seen in FIG. 1a, a threaded pin 8 is secured to the outer surface of the front wall (in the direction of travel of fiber tufts 2 and foreign bodies, etc. 3) of the suction element 4 and passes through an oblong slot 9 in the extension 7. The extension 7 is fixed in position relative to the wall of the suction element 4 by a nut 10. The extension 6 is similarly mounted on the outer surface of the rear wall of the suction element 4.

A collection container 12 which is open at the top is disposed at the end of the lower part of the chute 1; the foreign bodies, heavy parts or the like, possibly still with some fibers adhering to them, drop into this collection container 12.

Figure 2:
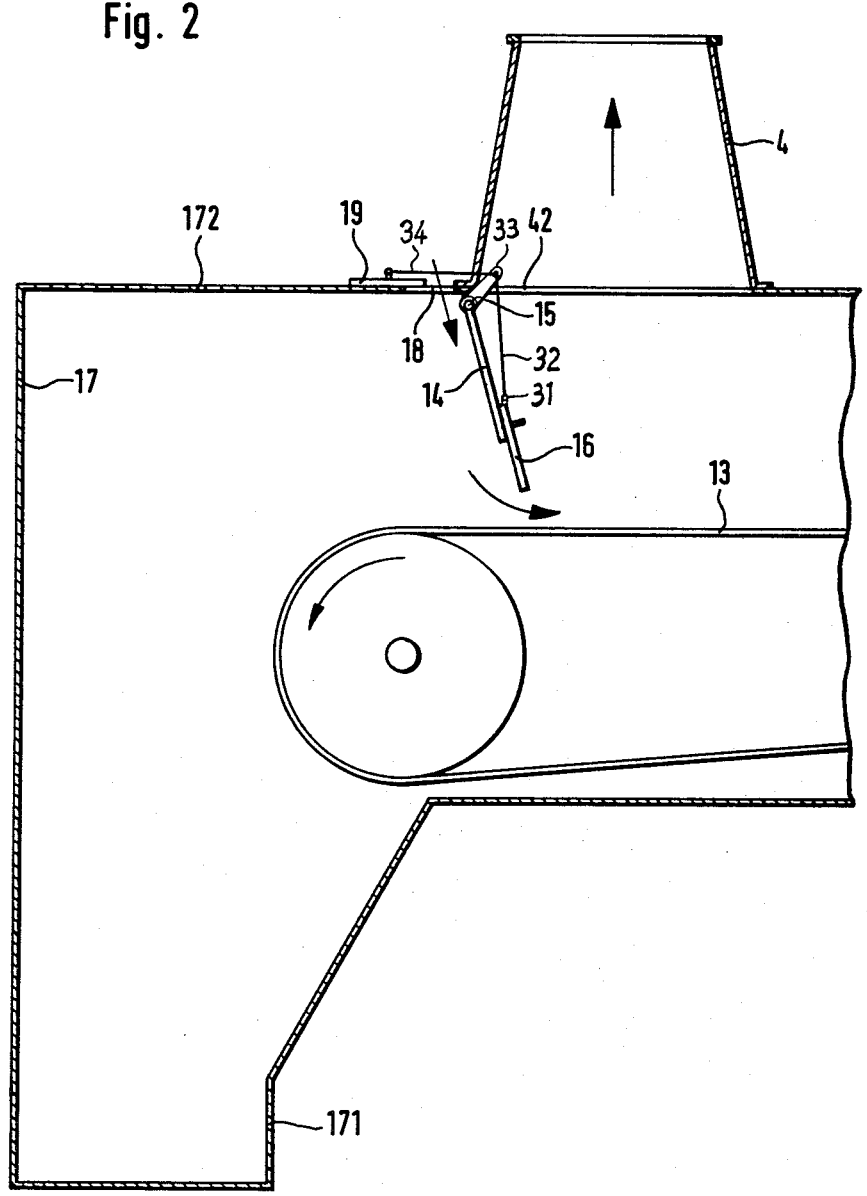
FIG. 2 is a schematic representation of a different embodiment of the invention having a conveyor belt, partitioning element and closed collection container with an adjustable air inlet opening.

In the embodiment of the invention shown in FIG. 2, a horizontally disposed conveyor belt 13 is provided as the conveyor element. A partitioning flap 14 is disposed as a partitioning element at the lower end of the suction element 4, that is, at the suction opening 42. The partitioning flap 14 is rotatably supported by a swivel joint 15 at its end oriented toward the suction element 4. The partitioning element 14 has an adjustable plate or extension 16 on its end oriented toward the conveyor belt 13. A closed collection container 17 is disposed as a collection element at one end of the conveyor belt 13. This collection container 17 is closed on all sides but has a feed opening which is embodied by the absence of a portion of the side wall 171 of the collection container 17 oriented toward the conveyor belt 13. The upper covering wall 172 of the collection container has an air inlet opening 18, the width of which can be adjusted by means of a sliding door 19. Air can either be aspirated through the opening 18 or air under pressure can be forced through the opening. In either event, air flows through the opening 18 and under the extension 16 countercurrent to the conveying direction to aid in the extraction process and supplement the upward air flow through the suction element 4.

The extension 16 is connected at 31 to a link 32 which projects upwardly to be joined to a lever 33 pivoted at the pivot point 15 for the partitioning element 14. This lever 33 is connected by link 34 to the sliding door 19. When the partition extension 16 is adjusted downwardly toward the conveyor 13, the door 19 is moved to the right to reduce the air inlet opening 18. Conversely, raising the extension 16 opens the inlet opening 18 more widely. Thus, when the length of the partitioning flap 14 is varied, there is a simultaneous variation of the air flow.

Figure 3:
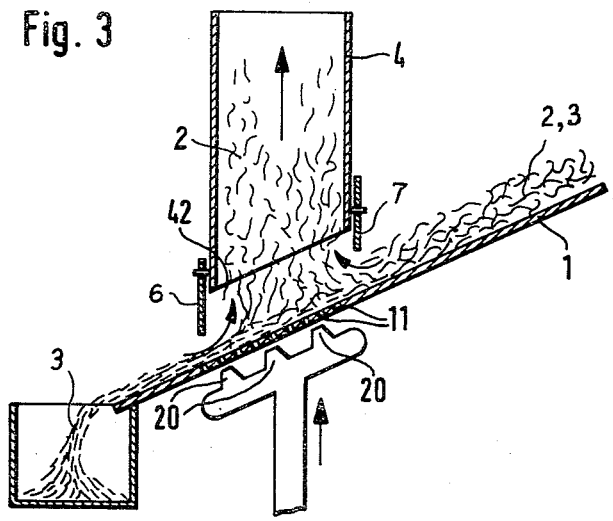
FIG. 3 schematically represents an additional version of the invention having a suction element, air-permeable chute and compressed-air nozzles.

As seen in FIG. 3, a chute 1 is provided as the conveyor element which has air passageway openings 11, and is, therefore, permeable to air at least in the vicinity of the suction element 4. Compressed-air nozzles 20 are disposed below the chute 1, in the vicinity of the suction opening 42 of the suction element 4. With this arrangement, supplemental air under pressure is directed upwardly through the material 2-3 on the conveyor 1 to aid in the separation.

Figure 4:
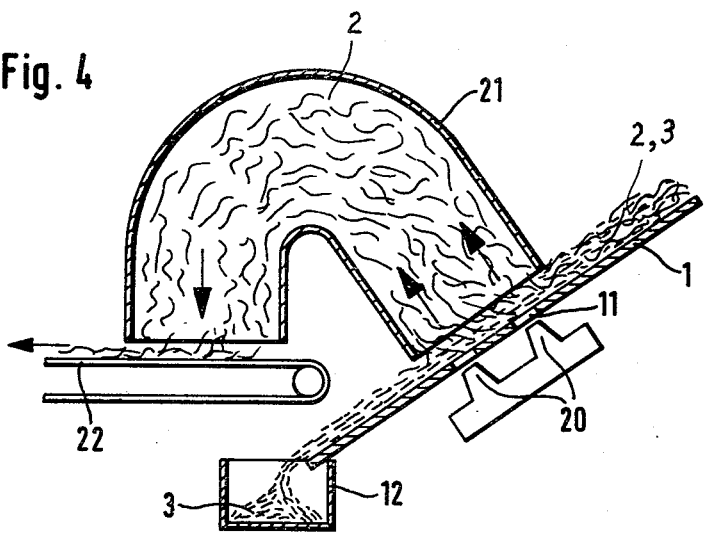
FIG. 4 schematically illustrates still another apparatus in accordance with the invention lacking a suction element but having an air-permeable chute and compressed-air nozzles.

FIG. 4 shows an embodiment in which no suction element is provided. In this embodiment, compressed-air nozzles 20, that is, blower nozzles, are disposed below a chute 1 which has air passageway openings 11. A curved tubular conduit 21 is disposed above the chute 1, and one open end of this conduit 21 is provided in the vicinity of the air passageway openings 11. The other open end of the tubular conduit 21 is directed at a conveyor belt 22. The cross-section of the tubular conduit 21 may be either round or angular. The utilizable fiber tufts 2 are separated from the foreign bodies, heavy parts or the like 3 of the heterogeneous mixture in the conveyor 1 solely by blown air from the compressed-air nozzles 20. The utilizable tufts 2 pass upward into the tubular conduit 21 and subsequently drop from the other end of the tubular conduit 21 onto the conveyor belt 22. The foreign bodies, heavy parts or the like 3 drop into a collection container 12 at the end of the chute 1.

It will be understood that the above description of the present invention is susceptible to various modifications, changes and adaptations, and the same are intended to be comprehended within the meaning and range of equivalents of the appended claims.

What is claimed is:

1. An apparatus for separating a desired essentially fibrous fraction from a heterogenous mixture of the desired fraction with relatively heavier foreign bodies, such as sheaths, metal parts, plastic parts and the like, and heavier parts such as stems, rind remnants, leaf parts and the like, comprising: a conveyor for conveying the mixture; suction means, including a suction conduit disposed adjacent and overlying a medial portion of said conveyor with its lower end directed at the mixture on said conveyor, for creating suction for removing the desired fibrous fraction from the mixture on said conveyor by elevating the desired fibrous fraction in an upward flow of air through said conduit; a receptacle into which said conveyor discharges; an enclosure connecting said conduit and said receptacle and enclosing said receptacle; a partition means interposed between said receptacle and said conduit within said enclosure and depending toward the upper surface of said conveyor; and means for introducing air into said enclosure adjacent said receptacle for flow between said partition means and said conveyor in a direction counter to the direction of travel of the mixture on said conveyor, and toward said conduit.

2. An apparatus as defined in claim 1 wherein said conveyor is a conveyor belt.

3. An apparatus as defined in claim 1 wherein said partition means is rotatably supported at its end oriented toward said conduit, whereby the position of said partition means relative to said conveyor can be adjusted.

4. An apparatus as defined in claim 1 or claim 3 further comprising an extension plate adjustably mounted on the end of said partition means adjacent said conveyor, whereby the spacing between said partition means and said conveyor can be adjusted.

5. An apparatus as defined in claim 4 wherein said means for introducing air into said enclosure includes an air inlet opening for said enclosure, and an adjustable element for adjusting the size of said inlet opening; and further comprising means interconnecting said extension plate on said partition means and said adjustable element so as to simultaneously adjust their relative positions.

6. An apparatus for separating a desired essentially fibrous fraction from a heterogeneous mixture of the desired fraction with relatively heavier foreign bodies, such as sheaths, metal parts, plastic parts and the like, and heavier parts, such as stems rind remnants, leaf parts and the like, comprising, in combination: a belt conveyor for conveying the mixture; suction means, including a suction conduit overlying a medial portion of said conveyor and having its lower end directed at the mixture on said conveyor, for creating suction for removing the desired fibrous fraction from the mixture on said conveyor by elevating the desired fibrous fraction in an upward flow of air through said conduit; a closed receptacle, having a feed opening in a side wall, disposed adjacent the discharge end of said conveyor such that said discharge end of said conveyor extends into said receptacle via said feed opening, said closed receptacle further having an upper covering wall which is connected to said suction conduit; a partition mounted on said covering wall and extending downward toward said conveyor; and an air entrance opening in said upper wall positioned and arranged for introducing air into said closed receptacle for flow between said partition and said conveyor in a direction toward said conduit and counter to the direction of travel of the mixture on said conveyor.

7. An apparatus as defined in claim 6 wherein said partition includes a first plate rotatably mounted on said upper wall and an extension plate slideably mounted on the lower end of said first plate.

8. An apparatus as defined in claim 7, further comprising: an adjustable slide mounted on said cover wall for adjusting the size of said air opening; and means interconnecting said extension plate and said adjustable slide for simultaneously moving same to adjust their relative position.

9. An apparatus as defined in claim 8, wherein said interconnecting means is constructed and arranged with respect to said adjustable slide so as to decrease the size of said air opening as said extension plate is extended to decrease the space between the lower end of said partition and said conveyor.

* * * * *